(12) United States Patent
Shevlin

(10) Patent No.: US 9,677,282 B2
(45) Date of Patent: *Jun. 13, 2017

(54) FIXTURE SUPPORT FOR MEMBRANE ROOF

(71) Applicant: William Edwin Shevlin, Santa Cruz, CA (US)

(72) Inventor: William Edwin Shevlin, Santa Cruz, CA (US)

(73) Assignee: Platinum Roofing, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/196,408

(22) Filed: Jun. 29, 2016

(65) Prior Publication Data
US 2016/0376789 A1  Dec. 29, 2016

Related U.S. Application Data

(60) Continuation-in-part of application No. 14/974,266, filed on Dec. 18, 2015, now Pat. No. 9,416,541,
(Continued)

(51) Int. Cl.
*E04B 1/00* (2006.01)
*E04G 21/00* (2006.01)
(Continued)

(52) U.S. Cl.
CPC .............. *E04D 13/00* (2013.01); *E04D 5/06* (2013.01); *E04D 5/143* (2013.01); *E04D 5/149* (2013.01);
(Continued)

(58) Field of Classification Search
CPC ......... E04D 5/149; E04D 5/145; E04D 5/144; E04D 5/143; E04D 5/14; E04D 1/34; E04D 2001/3414; E04D 2001/3408; E04D 2001/3426; E04D 2001/3432; E04D 2001/3435; E04D 2001/3441; E04D 13/00
(Continued)

(56) References Cited

U.S. PATENT DOCUMENTS 5,934,855 A * 8/1999 Osterle ................ E04D 3/3603
405/302.1
6,807,780 B2 * 10/2004 McCahill ................. E04C 3/02
248/300
(Continued)

*Primary Examiner* — Chi Q Nguyen
(74) *Attorney, Agent, or Firm* — Donald R. Boys; Central Coast Patent Agency, Inc.

(57) ABSTRACT

A modular anchor has a metal plate having a pattern of holes around a periphery, the forming a boundary of a central inner area, a metal bracket having a raised central portion and parallel wings having upper and lower surfaces in parallel horizontal planes, with the bracket joined to the metal plate at a central location within the hole pattern, the wings and the metal plate coated with a material to facilitate heat welding to membrane; and a transition membrane positioned on the metal plate with the raised portion of the bracket extending upward through an opening in the transition membrane, and with the transition membrane heat welded to the upper surfaces of the wings of the bracket and to the metal plate everywhere within the central inner area, leaving the pattern of holes exposed.

10 Claims, 14 Drawing Sheets

Related U.S. Application Data which is a division of application No. 14/264,331, filed on Apr. 29, 2014, now Pat. No. 9,238,914.

(51) Int. Cl.

| | |
|---|---|
| *E04G 23/00* | (2006.01) |
| *E04D 13/00* | (2006.01) |
| *E04D 5/06* | (2006.01) |
| *E04D 5/14* | (2006.01) |
| *F24J 2/52* | (2006.01) |
| *F24J 2/46* | (2006.01) |

(52) U.S. Cl.
CPC ........... *F24J 2/5247* (2013.01); *E04D 13/008* (2013.01); *F24J 2002/4678* (2013.01)

(58) Field of Classification Search
USPC ... 52/26, 219, 220.8, 741.1, 741.15, 746.11; 248/346.03, 560, 237
See application file for complete search history.

(56) References Cited

U.S. PATENT DOCUMENTS

| | | | |
|---|---|---|---|
| 8,623,158 B2* | 1/2014 | Stanley | E04D 13/1407 156/291 |
| 8,752,338 B2* | 6/2014 | Schaefer | F24J 2/5245 52/173.3 |
| 9,010,038 B1* | 4/2015 | Stearns | E04D 13/00 52/173.1 |
| 9,238,914 B2* | 1/2016 | Shevlin | E04D 5/149 |
| 9,416,541 B2* | 8/2016 | Shevlin | E04D 5/149 |
| 9,422,720 B2* | 8/2016 | Shevlin | E04D 5/147 |
| 2003/0182873 A1* | 10/2003 | Clasen | F24F 13/32 52/73 |
| 2007/0119117 A1* | 5/2007 | Gibbs | E04D 1/34 52/698 |
| 2012/0144760 A1* | 6/2012 | Schaefer | E04C 3/06 52/58 |
| 2013/0291479 A1* | 11/2013 | Schaefer | F24J 2/5245 52/745.21 |
| 2013/0305622 A1* | 11/2013 | Smeja | E04D 13/10 52/26 |

\* cited by examiner

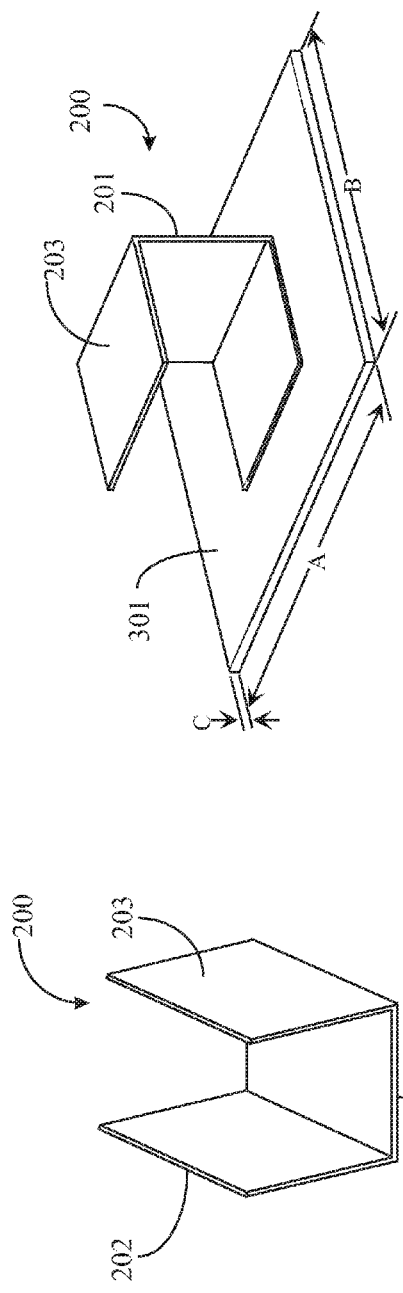
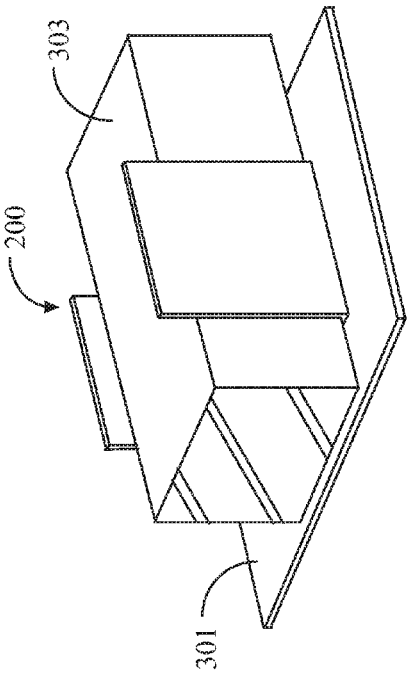
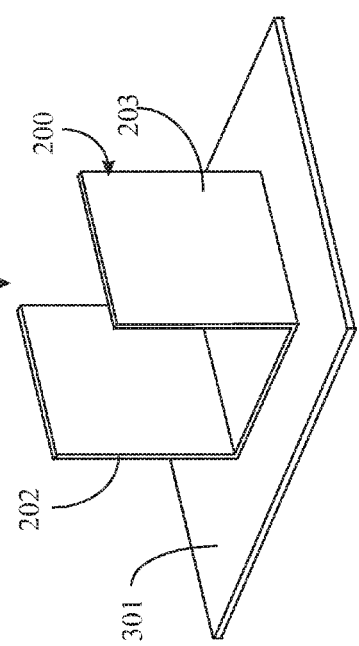
Fig. 3A
Fig. 3C
Fig. 2
Fig. 3B

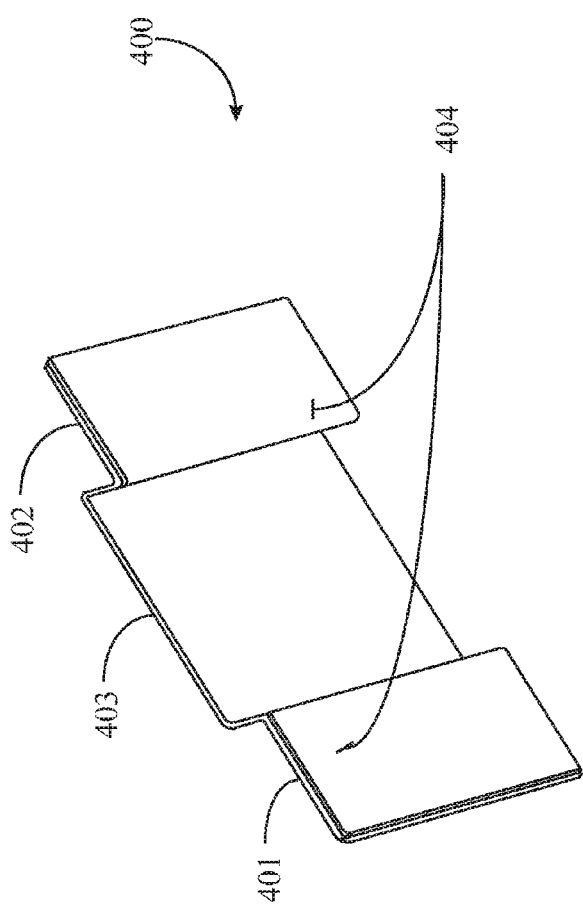
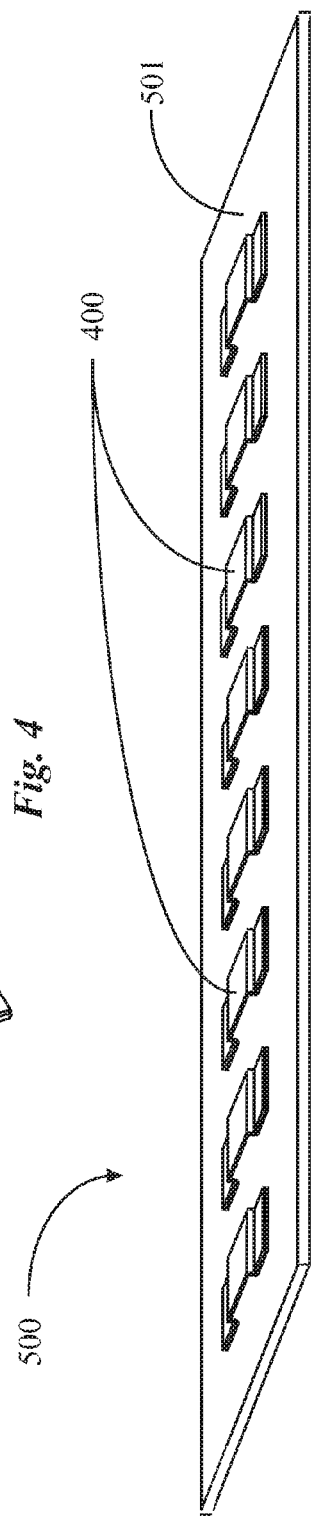

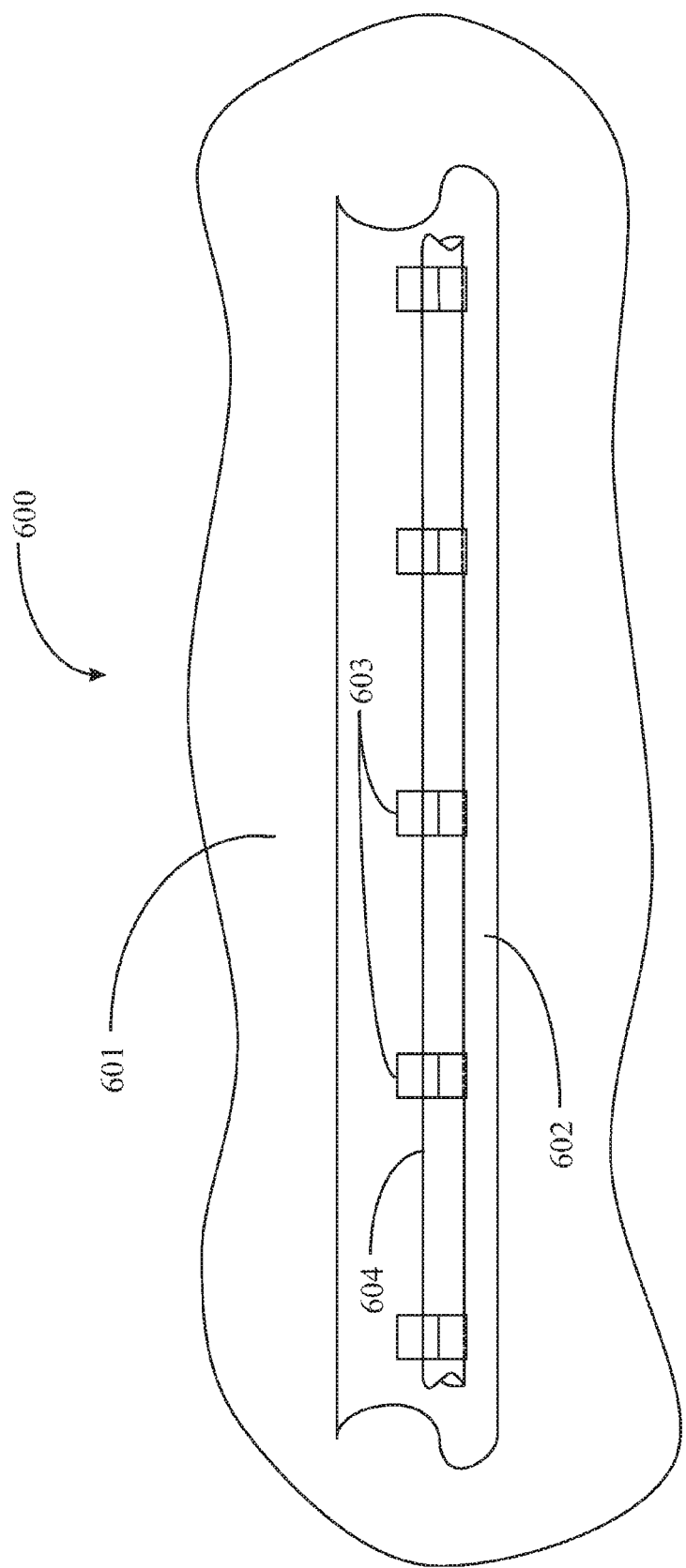

FIXTURE SUPPORT FOR MEMBRANE ROOF

CROSS-REFERENCE TO RELATED DOCUMENTS

The present application is a continuation-in-part application to pending application Ser. No. 14/974,266, filed on Dec. 18, 2015, and issued as U.S. Pat. No. 9,416,541 on Aug. 16, 2016, which is a divisional application of Ser. No. 14/264,331, filed Apr. 29, 2014 and issued as U.S. Pat. No. 9,238,914 on Jan. 19, 2016. All disclosure of the prior applications is incorporated herein at least by reference.

BACKGROUND OF THE INVENTION

1. Field of the Invention

The present invention is in the field of construction and pertains particularly to methods and apparatus for supporting fixtures on a membrane roof.

2. Discussion of the State of the Art

In the field of construction, particularly roofing, membrane roofing as it is known in the art is becoming a staple for certain roof systems that formerly would be covered in asphalt and or roof tar. Membrane roofing panels are typically available in sheets or rolls that may be cut to length and that may be secured to an unfinished roof surface, and heat welded together to form a unitary membrane.

Although there are a variety of membrane roofing materials available, more common compositions include Polyvinyl Chloride (PVC), Ketone Ethylene Ester (KEE), Chloro-Sulfonated Polyethylene (CSPE), Ethylene Propylene Diene Monomer (EPDM) and Thermoplastic PolyOlefin (TPO). Membrane roofing sheets may be mechanically fastened through the membrane with a screw, pin type fastener or other mechanical means un-finished roof with an overlapping edge of an adjacent sheet heat welded over the fastened line to cover and seal the fastener. Membrane roofs can also be adhered using a variety of adhesives by applying adhesive to the existing roof substrate, insulation, fire proof roof board or unfinished roof substrate. The exposed seams of the membrane are then heat welded to create a solid membrane out of the panels or rolls. Heat welding the panels together involves a surface-to-surface heating and fusion of the interfacing surfaces of adjacent panels or sheets, requiring a certain minimum temperature.

Membrane panels or sheets may be custom fabricated and may be offered in standard sizes. The material resiliency including flexibility may be designed into the product through varying the percentage of certain materials in the composite such as different percentages of rubber added to the composite.

Installing fixtures such as pipe brackets, solar panels, roof vents, air-conditioners, and other like accessories can be problematic after a membrane roof is installed, in that support structures designed to hold the fixtures in place are conventionally nailed or otherwise fastened to the roof over the membrane material, penetrating the membrane material at each anchor point. Although the penetrations may be small, nonetheless, roofing mastic, caulking, sealants, or a similar semi-viscous sealer is applied over the penetrations to seal them ensuring a leak proof or watertight roof system.

It has occurred to the inventor that such penetrations, although minor, have a collective negative effect on the long-term viability of the roofing system in protection against leakage. For example, roofing mastic, caulking, sealants, roof putty or other after-market sealers do not last as long as the membrane materials of the roof systems and therefore periodic reapplication of such sealing products is often required to preserve the integrity of the system, or leaks are sure to occur. Many roof manufacturers provide leak free warrantees that cover labor and materials up to 30 years. Penetrations directly into the roof membrane can in certain instances void these warrantees.

Therefore, what is clearly needed is an apparatus for supporting fixtures on a membrane roof that altogether eliminates the need for penetrating the membrane roofing material.

BRIEF SUMMARY OF THE INVENTION

In one embodiment of the invention a modular anchor for attaching fixtures to a membrane-covered roof is provided, comprising: a planar metal plate having a pattern of holes arranged around a periphery of the plate, the pattern of holes forming a boundary of a central inner area of the metal plate, a metal bracket having a substantially raised central portion and parallel wings on opposite sides at a lower extremity of the raised central portion, the wings of the bracket having upper and lower surfaces in parallel horizontal planes, with the bracket joined to the metal plate at a central location within the hole pattern by the lower surfaces of the wings being adhered to an upper surface of the metal plate, the upper surfaces of the wings and an upper surface of the metal plate being coated with a material to facilitate heat welding to membrane, and a transition membrane having an opening of size and shape of the raised central portion of the bracket and outer dimensions substantially greater than the central inner area of the metal plate defined by the pattern of holes in the metal plate, the transition membrane positioned on the metal plate with the raised portion of the bracket extending upward through the opening in the transition membrane, and with the transition membrane heat welded to the upper surfaces of the wings of the bracket and to the metal plate everywhere within the central inner area, leaving the pattern of holes exposed.

In one embodiment the modular anchor further comprises a plurality of brackets arranged in a predetermined pattern and adhered to the central inner area of the metal plate by adhering lower surfaces of wings of the brackets to the upper surface of the metal plate. Also in one embodiment adhesion between the bracket and the metal plate is accomplished by welding, soldering, brazing or by an adhesion glue or cement. Also in one embodiment the metal plate is circular, and in one embodiment the metal plate is rectangular.

In another aspect of the invention a method for attaching a modular anchor to a membrane-covered roof is provided, comprising (a) placing a modular anchor comprising a planar metal plate having a pattern of holes arranged around a periphery of the plate, the pattern of holes forming a boundary of a central inner area of the metal plate, a metal bracket having a substantially raised central portion and parallel wings on opposite sides at a lower extremity of the raised central portion, the wings of the bracket having upper and lower surfaces in parallel horizontal planes, with the bracket joined to the metal plate at a central location within the hole pattern by the lower surfaces of the wings being adhered to an upper surface of the metal plate, the upper surfaces of the wings and an upper surface of the metal plate being coated with a material to facilitate heat welding to membrane, and a transition membrane having an opening of size and shape of the raised central portion of the bracket and outer dimensions substantially greater than the central inner area of the metal plate defined by the pattern of holes in the metal plate, the transition membrane positioned on the metal plate with the raised portion of the bracket extending upward through the opening in the transition membrane, and with the transition membrane heat welded to the upper surfaces of the wings of the bracket and to the metal plate everywhere within the central inner area, leaving the pattern of holes exposed, upon membrane of a membrane-covered roof at a position where an anchor is desired, (b) folding the transition membrane back to expose the pattern of holes, (c) fastening the metal plate to the membrane covered roof by fasteners through the holes in the pattern of holes in the metal plate, into decking of the roof beneath the membrane of the membrane-covered roof; and (d) folding back the transition membrane over the pattern of holes and fasteners, and heat welding the transition membrane to the metal plate over the hole pattern and fasteners, and to the membrane of the membrane-covered roof all around the metal plate.

In one embodiment the method further comprises a plurality of brackets arranged in a predetermined pattern and adhered to the central inner area of the metal plate by adhering lower surfaces of wings of the brackets to the upper surface of the metal plate. Also in one embodiment adhesion between the bracket and the metal plate is accomplished by welding, soldering, brazing or by an adhesion glue or cement. also in one embodiment the metal plate is circular, and in one embodiment the metal plate is rectangular.

BRIEF DESCRIPTION OF THE SEVERAL VIEWS OF THE DRAWINGS

FIG. 2 is a perspective view of a fixture bracket with a membrane coating on an interfacing surface.

FIG. 3A is a perspective view of the bracket of FIG. 2 heat welded to a piece of membrane material at a first side.

FIG. 3B is a perspective view of the bracket of FIG. 2 heat welded to a piece of membrane material at a second side.

FIG. 3C is a perspective view of the bracket of FIG. 2 welded as in FIG. 3B having a wooden element held in the bracket.

FIG. 4 is a perspective view of a fixture bracket with membrane coatings on two interfacing surfaces.

FIG. 5 is a perspective view of an array of the fixture brackets of FIG. 4 heat welded to a piece of membrane material.

FIG. 6 is an expanded view of a vertically mounted conduit support structure according to an embodiment of the present invention.

DETAILED DESCRIPTION OF THE INVENTION

In various embodiments described in enabling detail herein, the inventor provides a unique apparatus and methods for supporting fixtures and utilities on a membrane roof system. The present invention is described using the following examples, which may describe more than one relevant embodiment falling within the scope of the invention.

It will also be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented within the scope of the invention. The invention is limited only by the breadth of the claims below.

Figure 1:
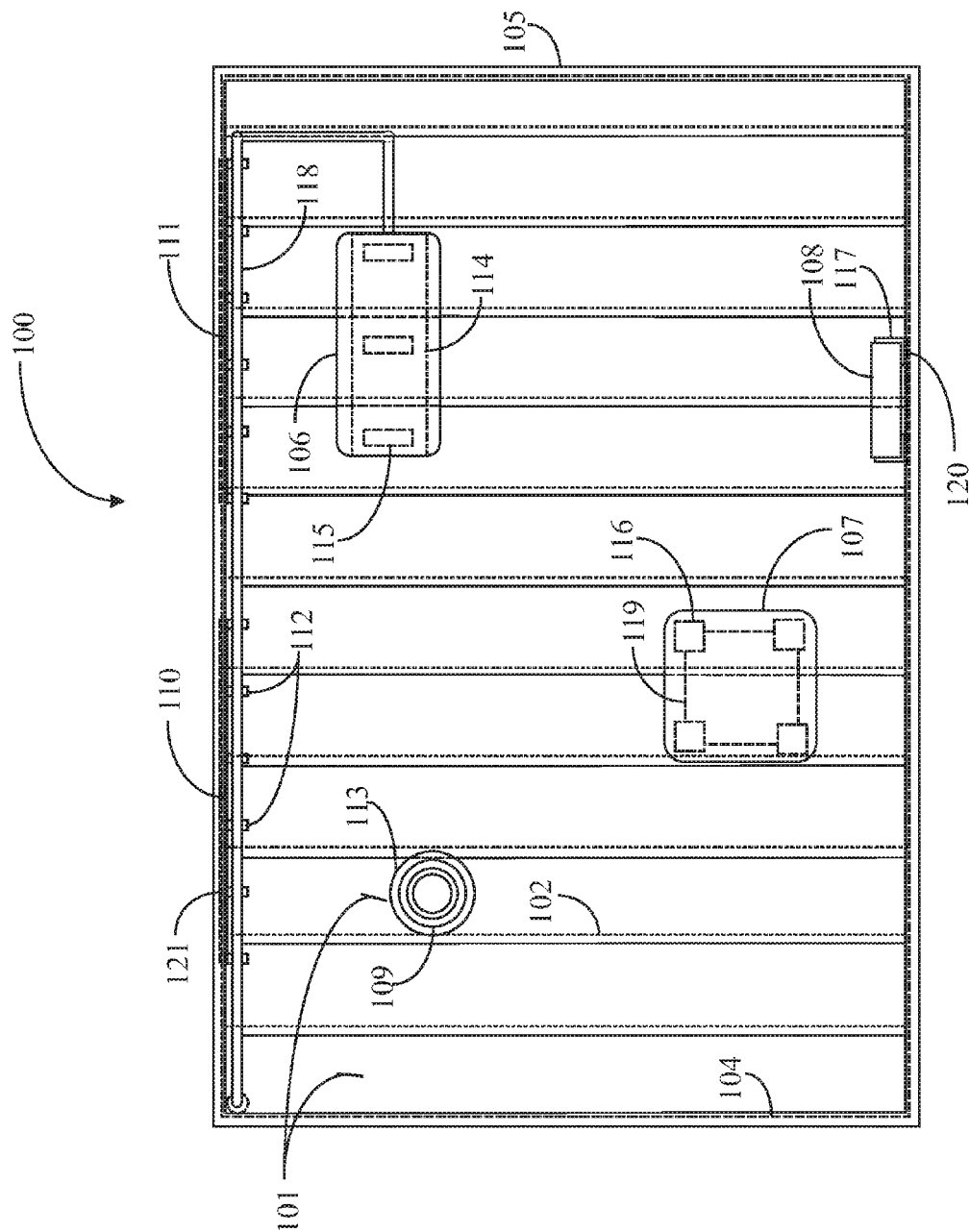
FIG. 1 is an overhead view of a membrane roof system supporting fixture installation according to an embodiment of the present invention.

FIG. 1 is an overhead view of a membrane roof system 100 supporting fixture installation according to an embodiment of the present invention. Roof system 100 may be formed of one of Polyvinyl Chloride (PVC), Ketone Ethylene Ester (KEE), Chloro-Sulfonated Polyethylene (CSPE), Ethylene Propylene Diene Monomer (EPDM) or Thermoplastic PolyOlefin (TPO) without departing from the spirit and scope of the present invention, or any other membrane material known in the art. Roof system 100 is laid over an unfinished roof surface using precut flexible roofing sheets 101.

The term membrane roughly refers to a flexible resilient roof made with a mixture of rubber and thermoplastic polymers. Such materials may be heat welded together to fuse the roofing sheets together presenting a leak proof covering. An important material in membrane roofing is thermoplastic PolyOlefin (TPO) in this example, however the present invention does not strictly depend on TPO for successful application. Therefore, other flexible or membrane type roofing materials may also be considered for heat weld such as Polyvinyl Chloride (PVC), Ketone Ethylene Ester (KEE), Chloro-Sulfonated Polyethylene (CSPE), or Ethylene Propylene Diene Monomer (EPDM).

Roofing sheets 101 are rolled out lengthwise and fastened (one edge) to the roof surface with subsequent sheets laid over the previous sheets to cover the fastening lines. The overlapping area of a sheet of membrane is heat welded over the fastening line (102) on the previous sheet installed to ensure watertight seal. In this example roof system 100 has a horizontal surface (floor) and four vertical surfaces (walls). Typically, wall or vertical covering is performed with the same material as the horizontal covering and wall sheets have adjacent edges overlapping and heat welded over the fastening lines of the edge panels or sheets on the horizontal surface or floor of the roof.

Roof system 100 in this example includes a number of fixtures that are installed and supported on both the horizontal roof surface and on at least two of the vertical surfaces. It is noted that a roof construction that may accept a membrane roof system may incorporate hips and valleys, sloped surfaces and non-flat surfaces, and other features without departing from the spirit and scope of the present invention. The apparatus may support fixtures installed on any of the surfaces of the roof.

In this example a fixture 107 is depicted on the horizontal roof surface after finishing (covering). Fixture 107 may be a heating/air conditioning unit for example. A fixture 106 is also depicted on the horizontal roof surface. Fixture 106 might be a solar system for providing electricity or for heating a pool, etc. A fixture 109 is depicted herein as a vent or flue. A fixture 108 is depicted as mounted on a vertical roof surface and might represent a fire extinguisher, an alarm, or some other utility. The opposing vertical roof surface supports fixture 118. Fixture 118 may be conduit, plumbing, cabling, etc. There are a great variety of such fixtures that may be necessary on a roof.

The fixtures in this example are held in place by one or more brackets. Brackets may be manufactured of galvanized steel (sheet metal) or other durable metals or suitable materials. Such brackets may be custom built for the type of fixture being mounted. In one example a support apparatus includes more than one bracket.

It may be desired to determine and mark areas on the roof where fixtures will be installed before laying out the membrane roofing materials over the unfinished roof. In this case it may be desired to provide extra support for some fixtures that are particularly heavy or may need extra support, such as on a vertical or sloped roof surface. In one embodiment such areas are marked and one or more pieces of roofing material are cut and fastened to the unfinished roof to provide underlying enhancement of adhesion to a roof before laying out the roofing sheets 101.

In this example a cut piece of roofing membrane material 119 is provided and stapled or otherwise secured directly to unfinished roof beneath where an A/C system (107) will later be installed. Sheets 101 are heat welded (overlapping bottom surfaces) to support piece 119 (top surface) as the membrane roof is installed. Locations 116 are locations for unique bracket assemblies that are fastened to the membrane roof as described in more detail below.

In this example there is another fixture 106 depicted as supported on roof system 100. Fixture 106 may be a solar power panel used to provide extra electricity or for heating pool water for example. Underneath roofing sheets 101 there is a cut piece of support membrane 114. As discussed above, this piece is directly attached to the unfinished roof with screw fastener or other fastening techniques in a marked location. Roofing sheets 101 are heat welded over the support pad (114) and overlapping areas of the sheets are heat welded together. Screw fastener may not be used in areas where the roofing sheet overlays a precut piece of membrane used as a base or pad. Instead the sheeting may be heat welded to the support piece so there are no penetrations to the exposed materials. Areas 115 are positions for unique brackets described below in another embodiment of the invention.

Fixture 106 has a conduit or pipe 118 connected to it. This conduit represents a water pipe, electrical conduit, or any other required tethering for successful operation of the fixture. Conduit 118 is supported partly on a vertical side of roofing system 100. In this case pre-assembled pieces 121 and 111 are attached to the unfinished roof surface as previously described. Then roofing sheets (vertical 104) are overlaid and heat welded to pieces 121 and 111. Bracket supporting strips 110 represent precut membrane strips that may host an array of brackets heat welded at strategic locations along the strip, as described in further detail below. In this case brackets 112 are vertically mounted conduit hangars of the appropriate dimension to support the diameter of the supported conduit 118.

Fixture 108 is also vertically mounted, the apparatus including fixture 108 installed on brackets 117 that are heat welded to membrane support piece 120. In this case there is no underlying support piece attached to the roof surface. Strip 117 with brackets 117 previously heat welded on to it is subsequently heat welded to the finished roof membrane surface after the roof is covered. In this case the fixture may be installed anywhere, as there was no pre-determined location on the unfinished roof marked to denote a location for the fixture. Similarly, vent fixture 109 may be coated on an interfacing flange and then heat welded to a support ring that is then heat welded to the top surface of the finished roof. If additional support is needed another support piece may be stapled or otherwise attached to the unfinished roof at the location or the vent. The overlying material is then heat welded to the support piece while the flange piece welded to the top support piece is then welded to the finished surface.

In this way all of the fixtures that need to be installed on a membrane roofing system may be secured without leaving any penetrations through the finished membrane roof. The exact cut sizes of support pieces and whether additional support pieces (underlying and surface) are required depend upon the fixture type, location of the fixture (horizontally or vertically mounted), the weight of the fixture, and the composition of the membrane materials used as support pieces. The mixture of the composite relative to the percentages of rubber, plastic, binders, and other materials may contribute to less or more resiliency and flexibility of the roofing material. For larger fixtures like utilities that have more weight, additional support membrane pieces may be provided and fixture location on the roof may be pre-designed. For lightweight fixtures such as conduit fixtures, light fixtures, etc., only a single support membrane piece might be required. In this case the fixture brackets are heat welded to the support piece, which is in turn heat welded over the finished roof surface.

FIG. 2 is a perspective view of a fixture bracket 200 with a heat-weldable coating on an interfacing surface. Bracket 200 may be a standard sheet metal bracket such as a galvanized steel bracket sheared and bent to design for the type of fixture to be held in place. In this example, bracket 200 is a U-shaped bracket having a side 201, a side 202, and a side 203, and sized to fit standard 4×4 lumber. Other brackets may be made for other standard sizes of lumber, or other pieces of support structure. The thickness of bracket 200 might vary, however one sixteenth of an inch to one eight of an inch may be sufficient thickness for such brackets.

Bracket 200 has a coating 204 covering an outside surface of wall 203. An interfacing surface refers to the surface that will interface and be heat welded to a support piece of roof material. It is important to note that the requirement of heat welding is that the coating is thick enough to be heat welded to the surface of the support piece wherein the materials fuse to form a contiguous bond. Coating 204 may be relatively thin compared to the thickness of a support piece of roof material. The exact thickness of the bracket coating may vary depending upon the thickness of the roofing material. Also, it is noted that the two materials (sheeting) and (coating) must be compatible for a contiguous heat weld application. In one embodiment both the coating and the roofing material is thermoplastic olefin (TPO). In embodiments of the invention brackets are formed from commercially-available galvanized sheets already coated on one side with TPO or one of the other formulations mentioned above, depending on the formulation of the membrane used for the roof on which the brackets may be attached.

FIG. 3A is a perspective view of bracket 200 of FIG. 2 heat welded to a piece of membrane material 301. Support piece 301 may be precut from roofing sheet material. In this configuration there is only a single bracket welded to a precut piece of roofing material. In other embodiments there may be an array of brackets heat welded to a single piece of membrane material. The length A and width B of piece 301 may vary according to fixture and bracket number requirements. Bracket 200 is shown heat welded to membrane piece 301 alongside 203, but may as well be heat welded alongside 201, facing open upward to receive a 4×4 beam, as shown in FIG. 3B. FIG. 3C illustrates the bracket welded as in FIG. 3B and having a wooden element 303 in place.

One piece of membrane material may support more than one and different types of brackets in a same assembly. The thickness C of piece 301 may be the same as or different from the thickness of the roofing membrane sheeting without departing from the spirit and scope of the invention. In a typical application support pieces may be cut from the same roofing materials used to cover the roof. Also, the length A and width B of piece 301 are sufficiently greater that the footprint of the bracket to allow for lifting edges to be able to heat the underside of piece 301 and the membrane roofing to which it is being heat welded.

FIG. 4 is a perspective view of a fixture bracket 400, which is a low profile bracket that designed for holding a rail that may be slid in underneath two or more brackets in an array. Such rails are, for example, support for solar panels in some circumstances. Brackets 400 are in this example made from pre-treated galvanized sheets as described above. In this example, bracket 400 has two parallel tabs or wings (401, 402) lying in the same plane and a raised middle section 403. Bracket 400 with a number of similar brackets may be heat welded in an array to a long piece of membrane material, as shown, that may then be heat welded to the finished roof covering as depicted in FIG. 5 of this specification.

FIG. 5 is a perspective view of an assembly 500 hosting an array of fixture brackets 400 heat welded to one long piece of membrane material 501. Assembly 500 comprises an array of low profile brackets 400 heat-welded in an array to membrane material 501. In this configuration, the brackets are designed to enclose a rail foot (not illustrated) of a solar panel apparatus or other roof top equipment. Sufficient membrane material 501 is used such that the assembly is flexible, and may be manipulated to efficiently heat weld to a membrane roof.

Support piece 501 may be cut from the roofing sheet and may be longer and considerably wider than the profile of the bracket array to allow for more heat weld surface. In an implementation such as this one, a user may slip a rail underneath the heat-welded brackets and then bolt the utility to the rail. There can be more than one of these support pieces, such as for a utility having two or more rails for example. Brackets may be provided in various differing configurations without departing from the spirit and scope of the invention.

In general implementation where more than one support piece of membrane material may be used, an installer may outline one or more footprint areas on an unfinished roof surface where fixtures are to be installed on the finished roof. The demarcations may be part of a drawing or blueprint with dimensions so they may again be located after the roofing material is laid out. At the outlined locations, the installer may fasten, such as by roof stapling, one or more than one precut membrane pieces to the unfinished roof prior to laying out the strips or rolls of membrane to form the membrane roof. The installer may then position and secure the roofing sheets over the unfinished roof and the added support pieces. The installer may use fasteners and heat welding to secure the membrane roof system over the unfinished roof.

It may be assumed that in one implementation the fixture brackets are formed from commercially-available metal sheets pre-coated with the membrane material. The installer may arrange the brackets and heat weld them to additional precut pieces of membrane. These support pieces may be heat welded to the finished roof at demarked support locations where underlying support pieces exist or at any location desired if an underlying support is not required for the type of and weight of the fixture. The installer then fastens the fixtures to the brackets.

Reasons for adding underlying support may vary according to the angle of roof surface and the type and weight of the supported fixture or utility. For example, something heavy on a horizontal surface or vertical surface may need extra support. Very lightweight fixtures such as conduit hangars for example might be installed anywhere on the finished roof as needed. In one implementation certain lightweight fixtures may be packaged with brackets already heat welded to cut membrane pieces that are compatible with (can be heat welded to) the standard roofing materials. In this case users may add aftermarket fixtures to upgrade lighting or other features on the roof. The heat welding process itself is known in the art and available for use in fusing the materials together in a secure and leak proof fashion.

FIG. 6 is an expanded view of a vertically mountable conduit support structure 600 according to an embodiment of the present invention. Structure 600 has a number of conduit support hangars (brackets) 603 that are designed to hold conduit on a vertical surface. Brackets 603 are formed, as described before, from commercially-available metal sheet pre-coated with compatible membrane material. Several brackets 603 are depicted as heat welded to a piece of precut membrane material 602.

The support apparatus (brackets heat welded to material) is heat welded to a finished vertical roof surface. Piece 602 may be as long as is required to span the length of the conduit to be mounted on the roof surface. In some implementation such as one depicted in the illustration of FIG. 1, two or more standard length support pieces (each hosting several conduit hangars) might be used collectively to hang the conduit. Many other fixture types may be installed to the finished membrane roof using the method of the present invention.

Figure 7:
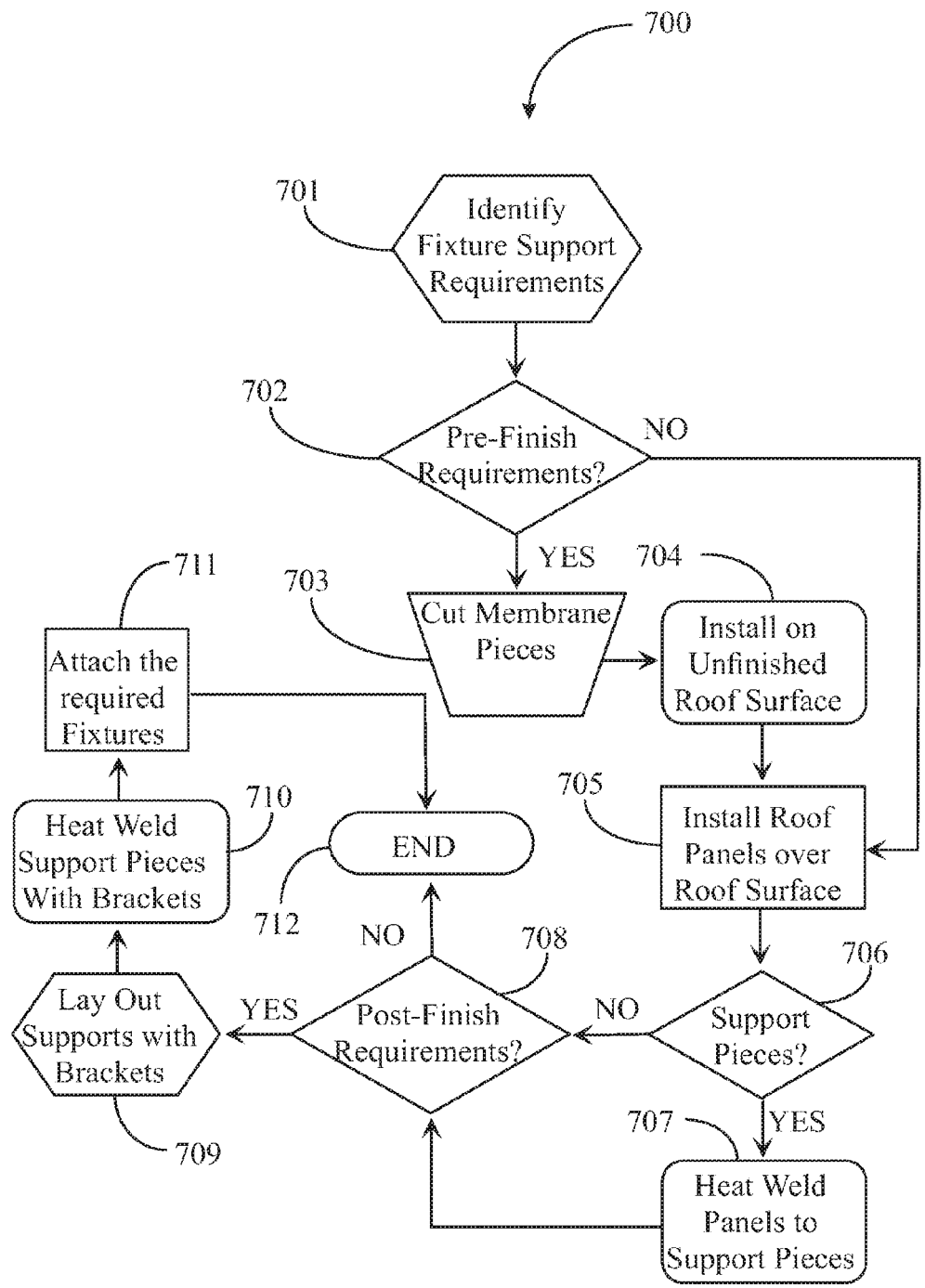
FIG. 7 is a process flow chart depicting steps for preparing a membrane roof system for fixture support or attachment according to aspects of the present invention.

FIG. 7 is a process flow chart 700 depicting steps for preparing a membrane roof system according to aspects of the present invention. In act 701 requirements are identified before roofing is applied to an unfinished roof. In this step the types of fixtures are identified and whether they need to be installed in certain areas on the roof, etc.

At step 702 it is determined if there are any pre-finish requirements relative to any of the fixtures identified in step 701. If there are pre-finish requirements at step 701 then the installer may precut pieces of the membrane sheeting material as required in step 703 to make the underlying membrane support areas. Any underlying pieces may be stapled or otherwise fastened to the unfinished roof at step 704. Underlying membrane support pieces may be installed on any angle of surface from horizontal to vertical.

If it is determined that there are no pre-finish requirements at step 702, the process may skip over to step 705 where the roof installation takes place. Likewise, conventional fasteners may be used to fasten one side of a roof sheet to the roof. Adjacent roofing sheets or panels are heat welded to the installed panels so only one side of a roofing sheet has to be fastened to the unfinished roof. An unfastened edge of a membrane roofing sheet is heat welded over a fastened edge of the previously installed sheet. The opposite edge of the heat-welded sheet may then be fastened to the unfinished roof.

At step 706 it is determined if there were support pieces attached to the roof as per step 704. If it is determined that there are pre-finish membrane support pieces on the roof the installer heat welds the roofing sheets to those support pieces wherever they occur in step 707. From either step 707 or step 706 in case of "no", it is determined whether there are any post-finish requirements (fixtures not requiring pre-finish support pieces) for attaching fixtures.

If it is determined that there are no post-finish requirements at step 708, then the process may end at step 711. If it is determined that there are post-finish requirements at step 708 the installer may lay out precut support pieces with the appropriate brackets heat-welded to those pieces at step 709. It may be assumed that the brackets are already heat-welded to the precut membrane pieces in the correct orientation to mount or otherwise connect the fixtures to the brackets. If this is not the case, additional steps for orientating the brackets and heat welding them to the pre-cut membrane support pieces may be required. For pieces containing multiple brackets, jigs or fixtures might be provided to help orientate those brackets for heat welding.

At step 710 the installer heat-welds the support pieces with the brackets attached to the finished roof at the pre-planned or desired locations. Fixture attachment to the brackets may also be performed at step 711 after the support pieces are finished and attached to the finished roof. The process may then end at step 712.

Figure 8:
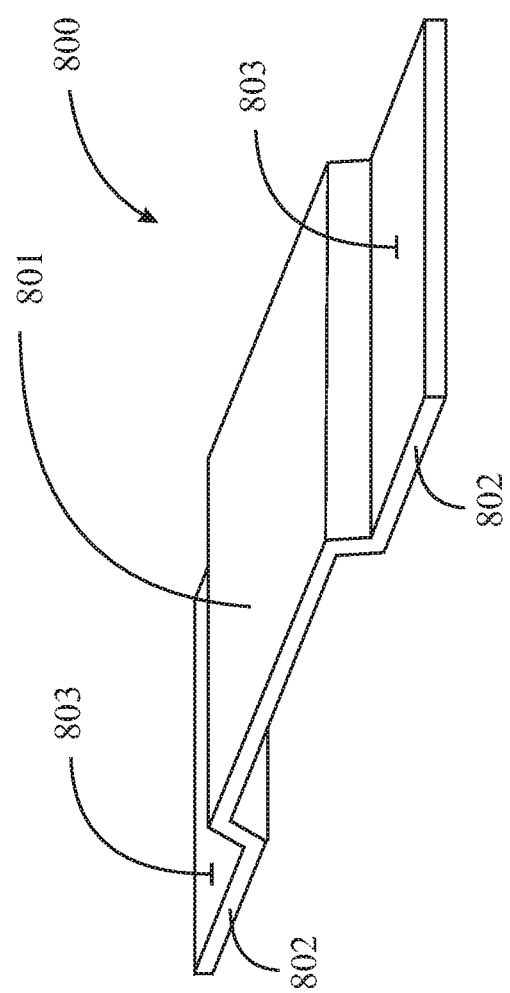
FIG. 8 is a perspective view of a bracket as used in an embodiment of the invention.

FIG. 8 is a perspective view of a bracket 800 as used in an embodiment of the invention. Bracket 800 is analogous to bracket 400 of FIG. 4_5 described above. Bracket 800 has a raised portion 801 and two parallel wings 802, also analogous to elements of bracket 400 described previously. The wings are provided to be adhered to a membrane roof, such that the raised portion 801 may be used to span a rail or some other element of a fixture or appliance to be mounted on a membrane roof. As described above for brackets 400, a plurality of such brackets may be adhered to a roof in a pattern to match a pattern of interface elements of the fixture or appliance to be mounted to the roof.

In the above description of the use of brackets 400 it is described that the bottom surface of wings 401 and 402 is coated with a material that is compatible for heat welding to a transition membrane (see element 501 in FIG. 4-5) that may subsequently be heat welded to the in-place membrane of an existing membrane roof. In implementation of brackets 800 the upper surfaces 803 of wings 802 are coated with the material compatible for heat welding to the transition membrane, rather than the bottom surfaces of the wings.

Figure 9A:
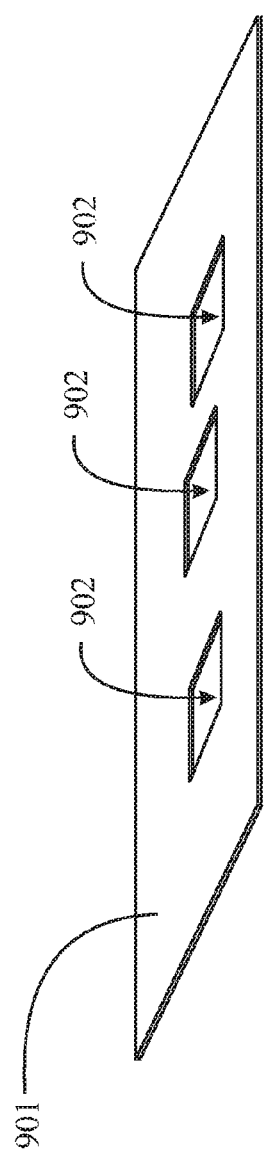
FIG. 9A is a perspective view of a transition membrane in an embodiment of the invention.
Figure 9B:
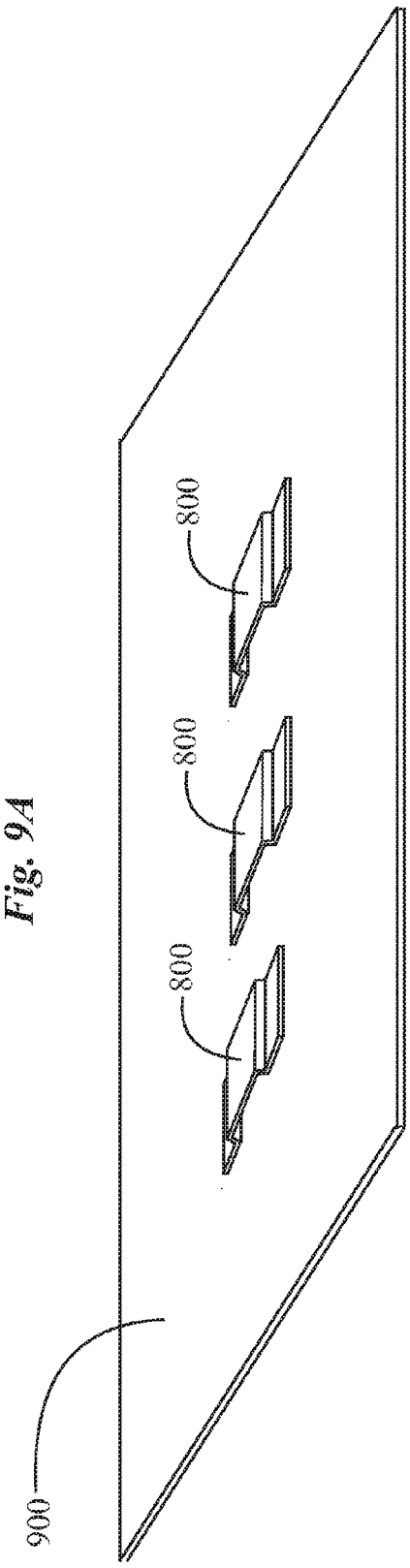
FIG. 9B is a perspective view of three brackets in a pattern.

FIG. 9A is a perspective view of a transition membrane 901, having a length and width that is substantially greater than the area defined by three brackets shown in a straight-line pattern in FIG. 9B. Transition membrane 901 has three rectangular cut-outs 902 in this example, each cut-out of a length and width to correspond to the length and width of just a raised portion of a bracket 800. Transition membrane 901 is provided for joining brackets to a roof membrane in an embodiment of the invention. FIG. 9B shows a plurality of brackets 800, three in this example, with compatible heat-weld coating on upper surfaces of the wings, arrayed in a straight-line pattern. The three brackets are shown resting on a surface 900 of membrane of an existing membrane roof, but are not fastened or heat-welded to the membrane 900 of the membrane roof.

Figure 10:
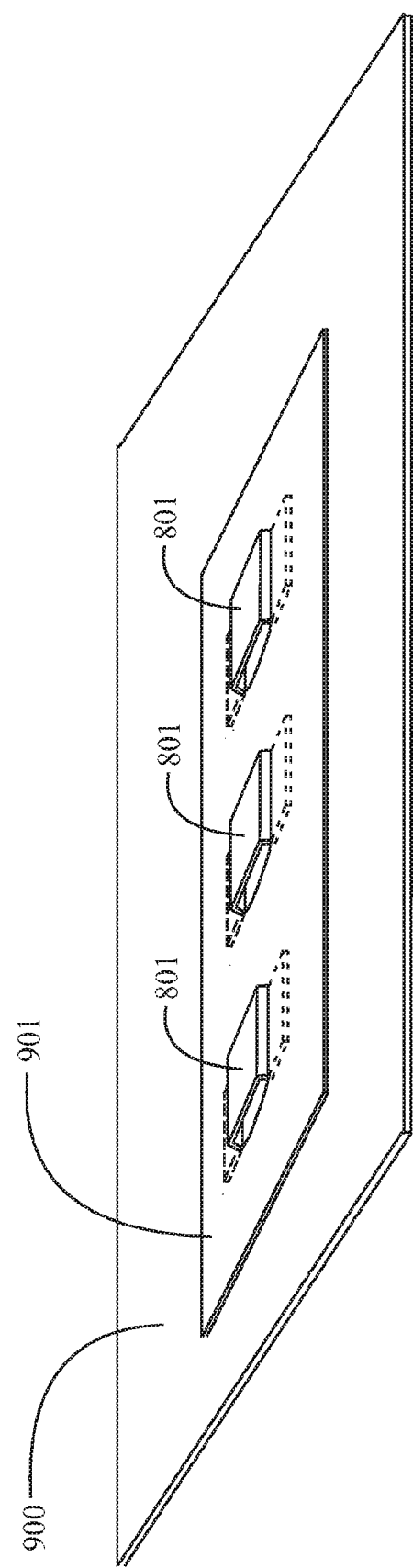
FIG. 10 is a perspective view of the elements of FIGS. 9A and 9B joined in an embodiment of the invention.

FIG. 10 shows the membrane 900 of the membrane roof, the three brackets 800 resting on that membrane, and transition membrane 901 lowered over the brackets 800 to cover the wings of each bracket and to rest on the membrane 900 of the membrane roof, leaving the raised portions 801 of each bracket protruding above the upper surface of the transition membrane 901. After positioning over the brackets, transition membrane 901 is heat welded to the coated upper surfaces of the wings of all the brackets, now beneath the transition membrane, and thus shown as dotted lines, and also to the membrane 900 of the membrane roof, being careful to accomplish heat welding between the transition membrane and the membrane of the membrane roof al around each bracket and fully out to the borders of the transition membrane.

The arrangement in this embodiment of the invention provides a moisture-proof seal around the brackets, and provides a stronger bond between the brackets and the membrane roof than the previously described embodiment wherein the brackets are coated on the bottom surfaces of the wings of the brackets, and the brackets are heat welded to a top surface of the transition membrane.

The skilled person will understand that the form of the brackets shown in this example is exemplary, and that the raised portion may take a variety of different forms, according to need of interface hardware of apparatus, such as appliances, that may need to be secured to a membrane-covered roof. The skilled person will also understand that the pattern of placement of the brackets is depended upon the need dictated by the interface hardware of an appliance to be mounted on the membrane roof, and the pattern may take a variety of geometric forms. What is essential is that there be parallel wings that may be coated on an upper surface and caused to be captured beneath a transition membrane as described above.

FIG. 11A is a perspective view of a bracket 1102 used according to a variation of the embodiment of FIGS. 8 through 10. Bracket 1102 is analogous to bracket 800 of FIG. 8. Bracket 1102 may be of another form and design without departing from the spirit and scope of the present invention. Bracket 1102 includes a raised central portion (surface) 1106, and wings 1103 having the upper surfaces thereof coated with a roof membrane compatible heat-weld induction material rather than the bottom surfaces as previously described.

In this example, shown in FIG. 11A, separate cut sections 1104 and 1105 of a transition membrane are provided to be heat-welded to the coated upper surfaces of wings 1103 rather than using a single transition membrane having cutouts for the raised portions of the brackets such as membrane 901 of FIG. 9A. The transition membrane sections 1104 and 1105 have a length and width dimension that is greater than the defined area of wing 1103 such that they each may overlap the wing portions of the bracket. It is noted herein that the shape or form of transition membrane sections 1104 and 1105 may vary widely depending upon the design of the bracket used. Bracket 1102 depicts one such design example. FIG. 11B illustrates a roof membrane 1100 to which bracket 1102 is joined.

Figure 12:
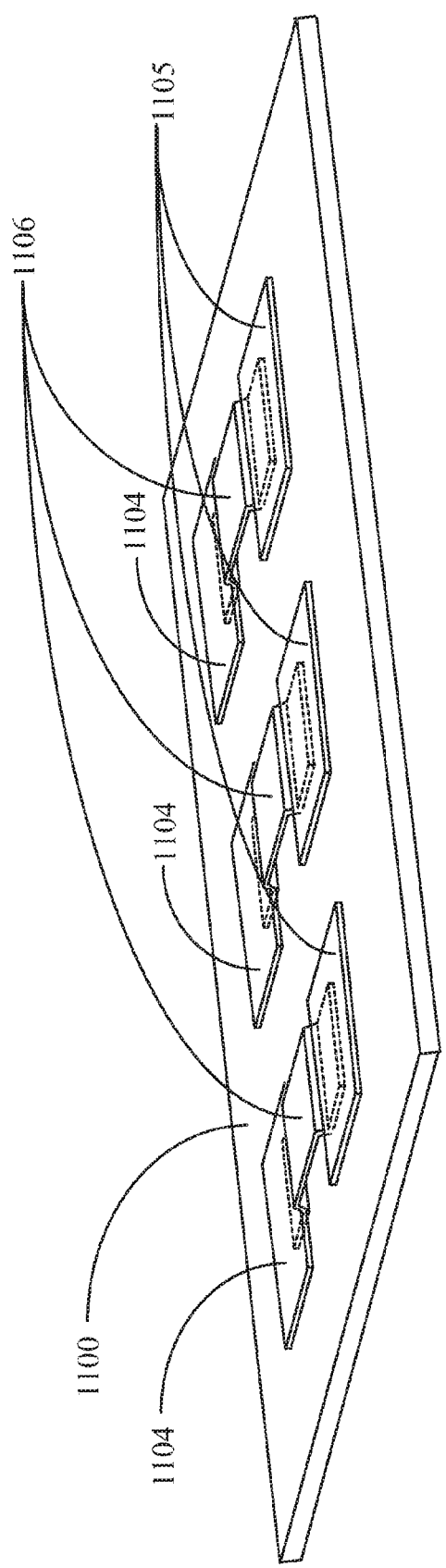
FIG. 12 is a perspective view of a plurality of brackets analogous to bracket 1102 of FIG. 10 arranged in a pattern and welded to a roof membrane.

FIG. 12 is a perspective view of a plurality of brackets analogous to bracket 1102 of FIG. 10 arranged in a pattern and welded to roof membrane 1100. In this example, multiple brackets are laid on roof membrane 1100 in a strategic pattern. Transition membrane sections 1104 and 1105 are heat welded to the roof membrane over the bracket wings. They are also welded onto the bracket wings at the upper surfaces thereof (wings depicted in broken boundary). The transition membrane sections have a thickness dimension smaller than the height from the upper wing surface to the exposed central portion of the bracket.

In one embodiment single brackets (1102) may be prepared for roof weld separately by application of the induction weld-compatible material to the upper surfaces of the wings. The brackets may be welded to the transition membrane sections at the upper surfaces of the bracket wings. Such prepared brackets may be collectively stored and brought out to a roofing construction or repair site when needed. In this example, there are three brackets secured onto roof membrane 1100 using transition membrane sections 1104 and 1105, however there may be fewer brackets or more brackets welded onto roof membrane 1100 using one or more sections of transition membrane without departing from the spirit and scope of the present invention.

Figure 13:
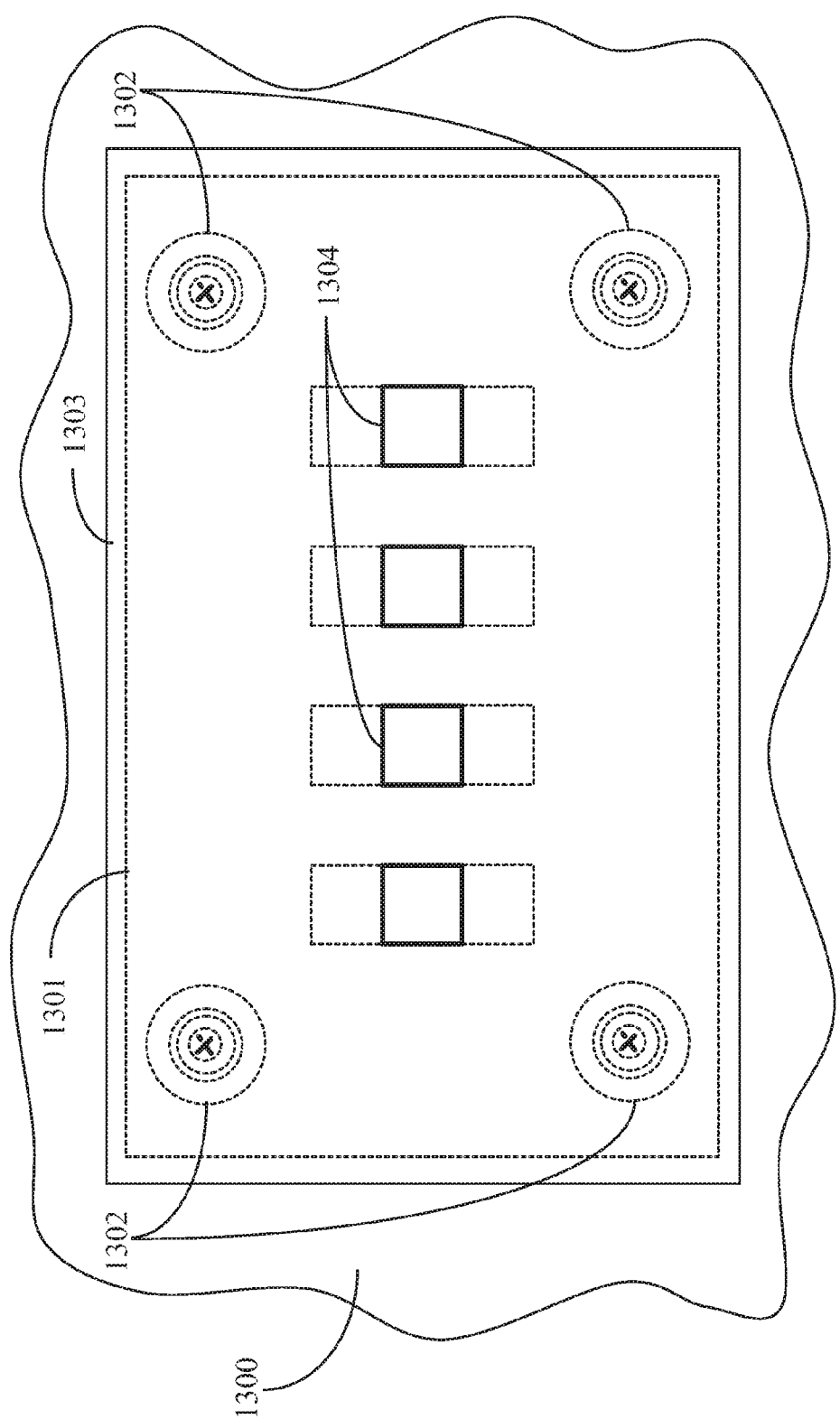
FIG. 13 is an overhead view of an installation using a first and second transition membrane and a plurality of metal plates with fasteners for reinforcement of bracket stability according to an embodiment of the invention.

FIG. 13 is an overhead view of a reinforced bracket installation according to another embodiment of the invention. In this example a first transition membrane 1301 may be laid over roofing membrane 1300, and may be anchored in place using metal discs or plates 1302 with openings for fasteners such as nails or screws that may be inserted there through and may penetrate into the roof decking below the roofing membrane.

Plates 1302 are annular in this embodiment however other shapes may be utilized such as common geometric shapes and custom shapes for some installations depending upon the appliance and fixtures that will be mounted. In one embodiment plates 1302 include downward facing barbs to stick into to the surface of first membrane 1301. In this example screws are used to anchor plates 1302 securing first membrane 1301 to roof membrane 1300 and into the wood decking below. Plates 1302 may be placed in a strategic pattern and there may be more or fewer plates 1302 securing first membrane 1301 to roof membrane 1300 and the underlying deck than are illustrated in this example.

The upper surface area of plates 1302 may be coated with a compatible induction heat-weld coating in one embodiment either before, or after the fasteners are inserted and driven down into the decking. Anchoring of a first transition membrane in this fashion provides more thickness (roof membrane, first transition membrane) at the base of a future fixture installation thereby increasing its stability.

Figure 11:
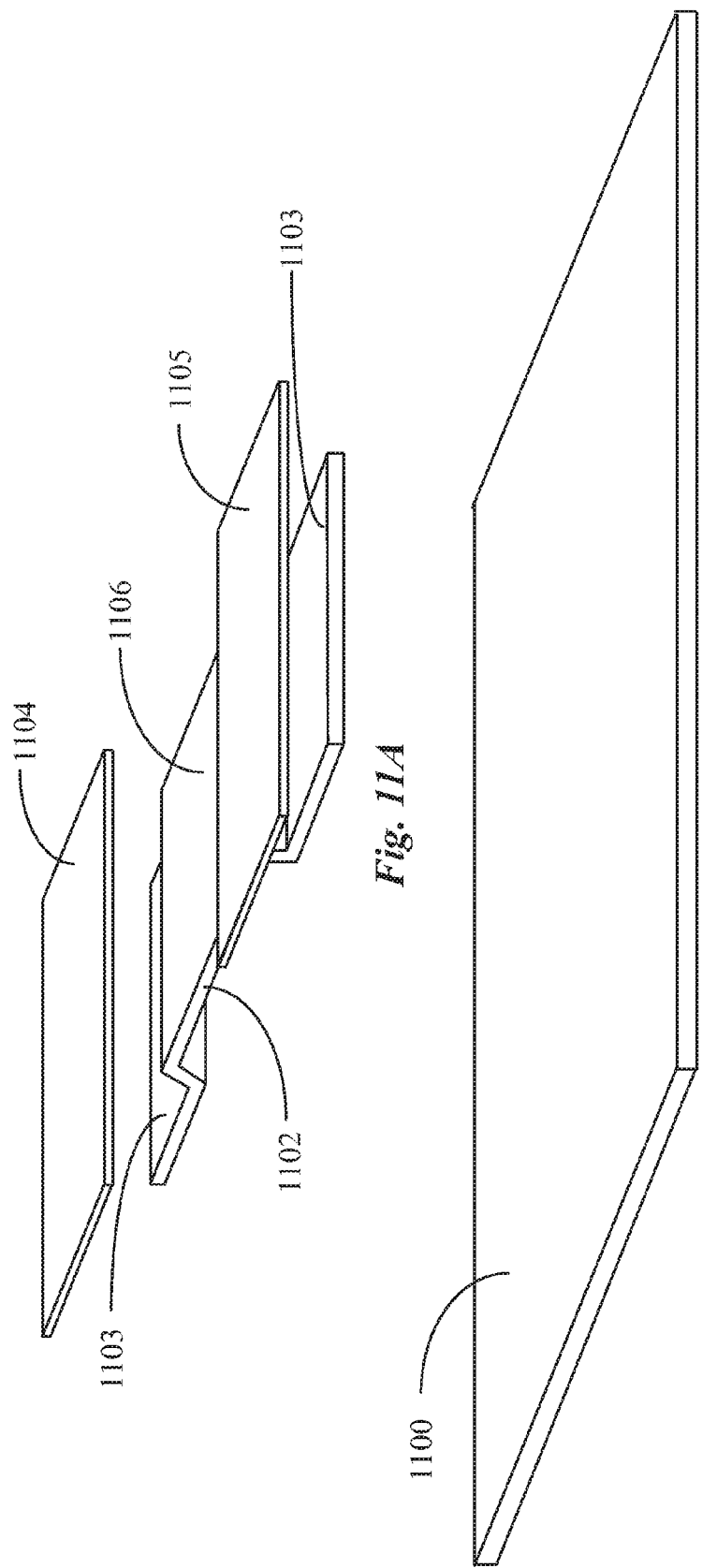
FIG. 11A is a perspective view of a bracket and transition membranes in an embodiment of the invention.
FIG. 11B is a perspective view of a roof membrane in an embodiment of the invention.

A plurality of brackets analogous to the brackets (1102) of FIGS. 11 and 12 having induction heat-weld compatible material coated on the upper surfaces of the bracket wings are depicted welded to a second transition membrane 1303 in the fashion described further above relative to FIG. 12. This bracket assembly may be prefabricated and brought to the roof site. The second transition membrane 1303 has a width and length overlapping the boundaries of the first membrane and anchor positions (plates 1302).

In this example, transition membrane 1303 has a pattern of cutouts adapted to fit over the raised portions 1304 of the brackets and the wings of the brackets have heat-weld coating on the upper surfaces thereof. However, both interfacing surfaces of the brackets may be so coated without departing from the spirit and scope of the present invention. In this embodiment the second transition membrane supporting the bracket pattern is laid over the first transition membrane wherein the second membrane overlaps the first membrane in overlay. A heat induction welder may be used to weld the second transition membrane to the first transition membrane and to the roofing membrane covering the first transition membrane and the anchor positions completely in overlap fashion.

In this embodiment the second transition membrane may comprise of more than one separate section without departing from the spirit and scope of the invention, the aggregate thereof having the overall dimensioning required to cover the first transition membrane and the anchor positions. In this example, the transition membranes used are rectangular sections however other geometric and custom shapes may be fabricated or cut from a larger section without departing from the spirit and scope of the present invention. The fixture or appliance may be mounted to the exposed surfaces of the metal brackets. This reinforced installation may be implemented using single brackets or multiple brackets arranged in a pattern.

Figure 14:
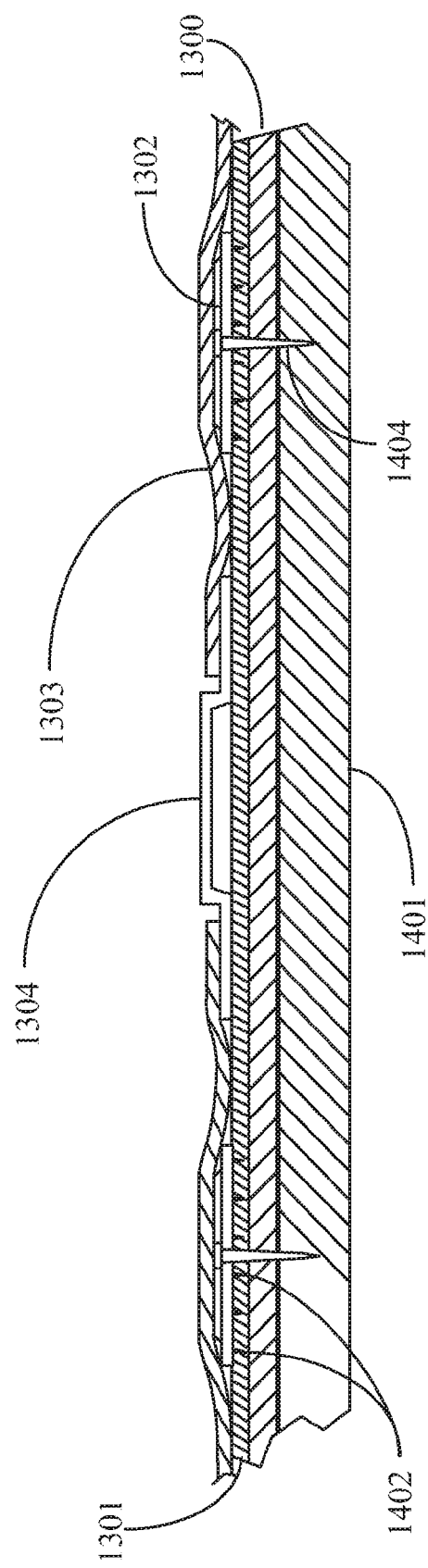
FIG. 14 is a sectioned elevation view of the installation of FIG. 13.

FIG. 14 is sectioned elevation view of the reinforced installation of FIG. 13. In this view a roofing underlay or decking material 1401 is depicted with roof membrane 1300 installed there over. In this example first transition membrane 1301 is laid over roof membrane 1300 and anchored to the roof using metal plates 1302 with fasteners 1404 penetrating through roofing membrane 1300 and into decking 1401.

In one embodiment first transition membrane 1301 is anchored and induction heat welded to roofing membrane 1300. In another embodiment it is simply anchored in place using fasteners 1404. In one embodiment plates 1302 include a plurality downward facing barbs 1402 to aid in gripping the membrane at the desired anchoring position for each plate. In one implementation the upper surfaces of plates 1302 are coated with an induction heat weld material compatible with the transition membrane material.

In this implementation, plates 1302 rest on top of first transition layer and anchor it down tightly. The transition layer may also be heat welded directly to roofing membrane 1300 to further strengthen the base facility for a future fixture or appliance. A bracket analogous to bracket 800 of FIG. 8 above is depicted welded to second transition layer 1303. In this implementation the bracket is welded to the second transition layer at the upper coated surfaces of the bracket wings. In another implementation the bracket may be heat welded to the second transition membrane at the downward facing surfaces of the bracket wings. In one embodiment, there is a single bracket welded to second transition membrane 1303. In another implementation such as depicted above in FIG. 13, there is strategic a line of two or more brackets or a distributed pattern of brackets arrayed in some geometric pattern.

Upper and centrally exposed bracket surface 1304 is a mounting location for a fixture or appliance. As previously described, the assembly including the bracket and the second transition membrane may be prefabricated, stored for later use, and brought to the site when the appliance install phase of a roofing operation is in progress or about to begin.

In this example, second transition membrane 1303 supporting the bracket or pattern or line of brackets is overlaid onto the anchored first transition membrane such that the perimeter boundaries of the second transition layer overlap the boundaries of the first transition membrane with a margin of extension out onto the roof membrane in both length and width dimensions. Second transition membrane 1303 may be induction heat welded to first transition membrane 1301 and to the upper surfaces of plates 1302 thereby sealing off the anchor points from exposure to weather.

Figure 15:
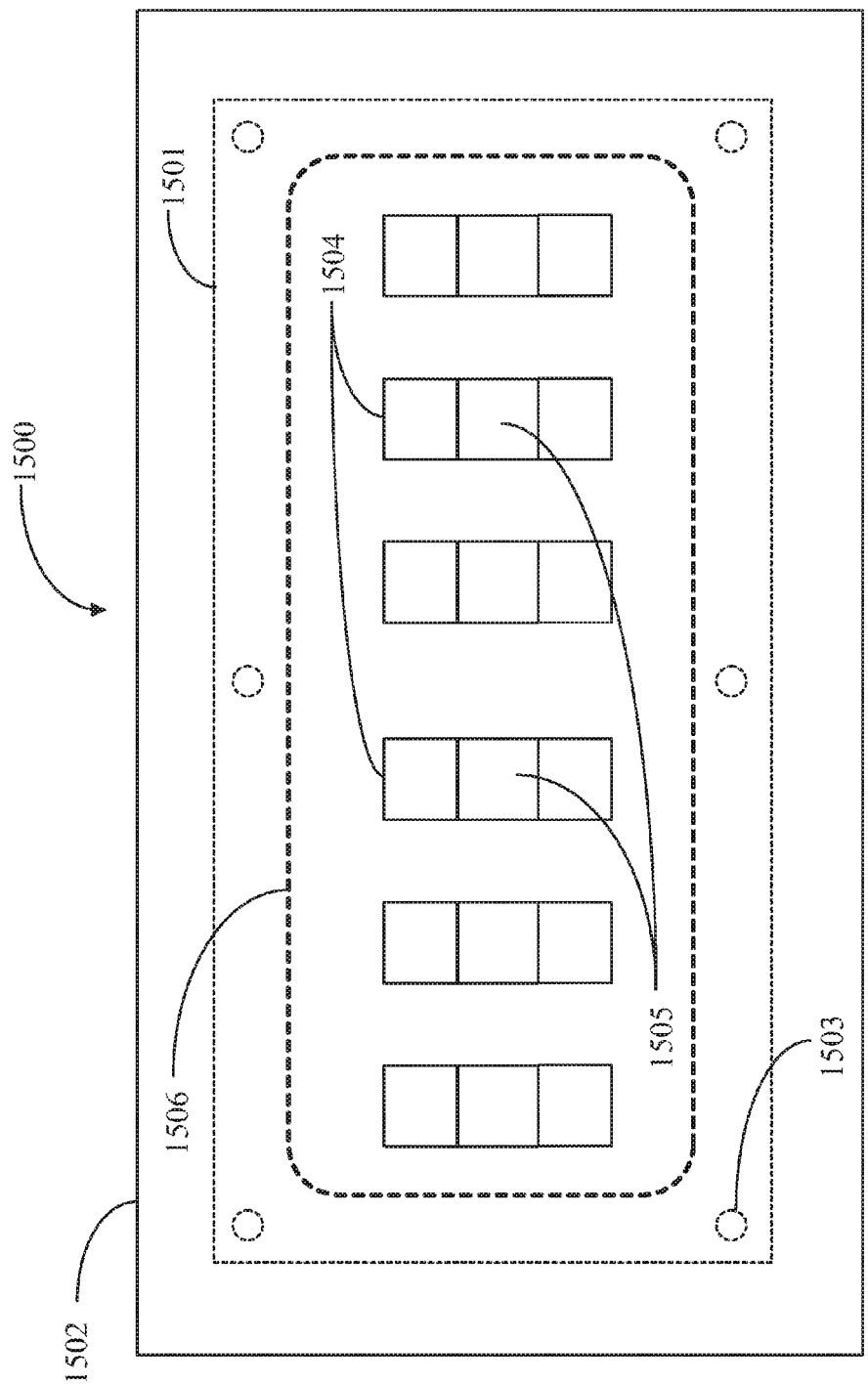
FIG. 15 is an overhead view of a bracketed roof installation according to another embodiment of the present invention.

FIG. 15 is a plan view of a bracketed roof installation 1500 according to another embodiment of the present invention. In one embodiment maximum reinforcement may be desired for holding particularly heavy objects, appliances, or fixtures in place on a rooftop.

A bracketed roof installation module 1500 includes a metal plate 1501 such as an aluminum or stainless steel plate having a length, a width, and a thickness. Plate 1501 in this example has a pattern of holes 1503 placed strategically about a periphery of the plate in a rectangular pattern. Openings 1503 are for fasteners for securing plate 1501 to a membrane-covered roof, with the fasteners passing through the membrane into the decking under the membrane. Plate 1501 has a heat weld-compatible coating on an upper surface to facilitate heat welding a transition membrane 1502 to the coated surface of the metal plate.

Six brackets 1504, having wings 1505, analogous to brackets 1102, are adhered, wings down, to metal plate 1501. The brackets may be joined to the metal plate by welding, soldering, by an adhesion cement, or possibly other ways. A transition membrane 1502 of dimensions and area greater than metal plate 1501, and having openings 1507 for the raised portions of brackets 1504, is placed over the brackets adhered to the metal plate, and heat welded to the metal plate around the brackets, out to a boundary shown as dotted line 1506, which is within the pattern of holes 1503.

At this point metal plate 1501 with the six brackets 1504 and transition membrane 1502 provide a modular assembly that may be duplicated and stored for later use on a roof. When an anchor of this configuration is need to secure an appliance to a membrane-covered roof, the assembly described with reference to FIG. 15 may be placed on the membrane of the membrane-covered roof, the transition membrane may be lifted to expose holes 1503, which may be done one or two holes at a time, and the metal plate may be fastened to the roof through the membrane into the decking below the membrane of the membrane-covered roof.

After fastening the metal plate, with the adhered brackets, to the roof, it remains to heat weld transition membrane 1502 to metal plate 1501 outside the area bounded by line 1506, and to the membrane of the membrane-covered roof outside the border of metal plate 1501.

This procedure enables off-roof assembly of a plurality of metal plate-backed brackets in pre-planned patterns for a variety of purposes, and quick and sure mounting of the bracket assemblies to a membrane-covered roof.

The skilled person will understand that an assembly of the sort described here may consist of just one bracket adhered to a metal plate with a pattern of mounting holes surrounding the bracket, and a transition membrane of greater extent of the metal plate, or may consist of two or many more brackets on a metal plate. There is no limitation that the metal plate be round or rectangular, and the plate may be made in a variety of shapes and sizes. The issue is that the transition membrane be heat welded to the metal plate in a manner that the holes in the plate are accessible to fasten the plate, hence the bracket of brackets, to the roof, with the transition membrane capable of covering the hole pattern after the plate is bolted to the roof, and to extend beyond the edges of the metal plate everywhere, so the transition membrane may be heat welded to the membrane of the membrane-covered roof outside and around the metal plate.

Figure 16A:
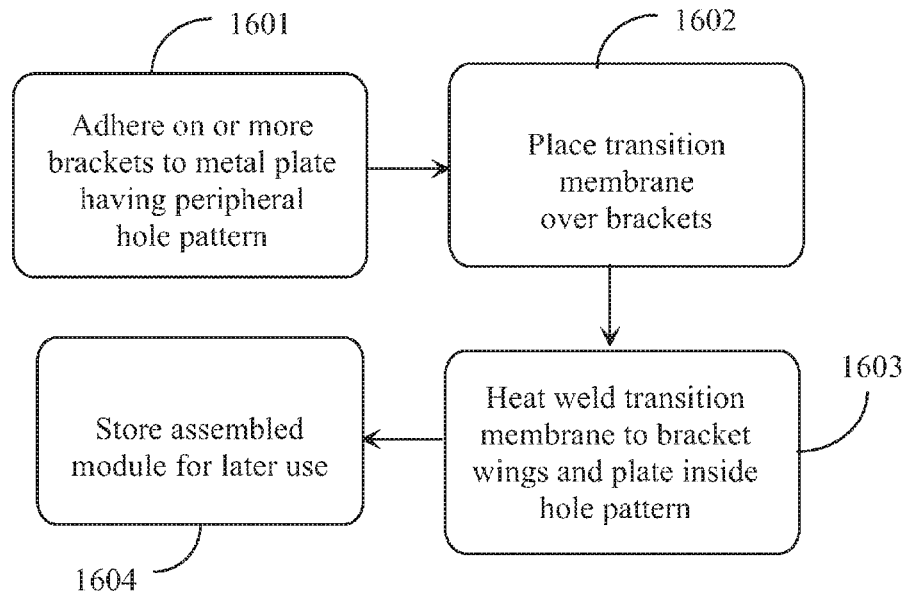
FIGS. 16A and 16B are process flow charts depicting steps for fabricating and installing the modular bracket roof installation of FIG. 15.
Figure 16B:
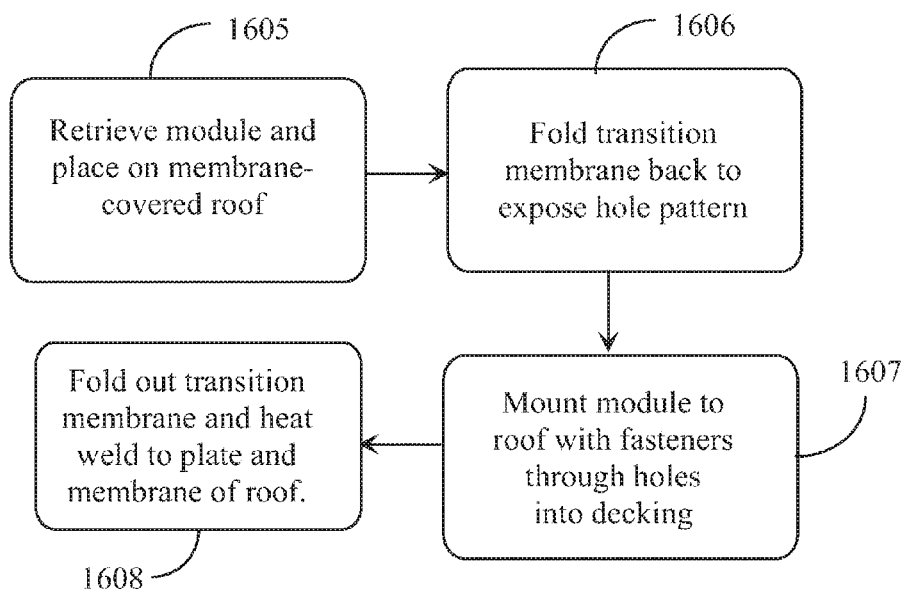

FIGS. 16A and 16B are flow charts depicting processes in an embodiment of the invention. In FIG. 16A, at step 1601 one or more brackets are adhered to a metal plate having a peripheral hole pattern. Adherence may be accomplished by an adhesion cement, glue, welding, soldering or in another manner. At step 1602 a transition membrane greater in dimension than the plate, and having an opening for a raised portion of the bracket, is placed over the bracket or brackets. At step 1603 the transition membrane is heat welded to the bracket wings and to the metal plate inside the hole pattern. At step 1604 the finished module is stored for later use.

At step 1605 in FIG. 16B a module is retrieved from storage and placed at a desired place on a membrane-covered roof. At step 1606 the transition membrane is folded back to expose the mounting holes. At step 1607 the module is mounted to the roof using fasteners through the holes in the plate into decking under the membrane of the membrane-covered roof. At step 1608, the transition membrane is folded out and heat welded to the rest of the metal plate and to the membrane of the membrane-covered roof, providing a leak proof seal to the roof.

It will be apparent to one with skill in the art that the system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

The invention claimed is:

1. A modular anchor for attaching fixtures to a membrane-covered roof, comprising:
    a planar metal plate having a pattern of holes arranged around a periphery of the plate, the pattern of holes forming a boundary of a central inner area of the metal plate;
    a metal bracket having a substantially raised central portion and parallel wings on opposite sides at a lower extremity of the raised central portion, the wings of the bracket having upper and lower surfaces in parallel horizontal planes, with the bracket joined to the metal plate at a central location within the hole pattern by the lower surfaces of the wings being adhered to an upper surface of the metal plate, the upper surfaces of the wings and an upper surface of the metal plate being coated with a material to facilitate heat welding to membrane; and
    a transition membrane having an opening of size and shape of the raised central portion of the bracket and outer dimensions substantially greater than the central inner area of the metal plate defined by the pattern of holes in the metal plate, the transition membrane positioned on the metal plate with the raised portion of the bracket extending upward through the opening in the transition membrane, and with the transition membrane heat welded to the upper surfaces of the wings of the bracket and to the metal plate everywhere within the central inner area, leaving the pattern of holes exposed.

2. The modular anchor of claim 1 further comprising a plurality of brackets arranged in a predetermined pattern and adhered to the central inner area of the metal plate by adhering lower surfaces of wings of the brackets to the upper surface of the metal plate.

3. The modular anchor of claim 1 wherein adhesion between the bracket and the metal plate is accomplished by welding, soldering, brazing or by an adhesion glue or cement.

4. The modular anchor of claim 1 wherein the metal plate is circular.

5. The modular anchor of claim 1 wherein the metal plate is rectangular.

6. A method for attaching a modular anchor to a membrane-covered roof, comprising:
(a) placing a modular anchor comprising a planar metal plate having a pattern of holes arranged around a periphery of the plate, the pattern of holes forming a boundary of a central inner area of the metal plate, a metal bracket having a substantially raised central portion and parallel wings on opposite sides at a lower extremity of the raised central portion, the wings of the bracket having upper and lower surfaces in parallel horizontal planes, with the bracket joined to the metal plate at a central location within the hole pattern by the lower surfaces of the wings being adhered to an upper surface of the metal plate, the upper surfaces of the wings and an upper surface of the metal plate being coated with a material to facilitate heat welding to membrane, and a transition membrane having an opening of size and shape of the raised central portion of the bracket and outer dimensions substantially greater than the central inner area of the metal plate defined by the pattern of holes in the metal plate, the transition membrane positioned on the metal plate with the raised portion of the bracket extending upward through the opening in the transition membrane, and with the transition membrane heat welded to the upper surfaces of the wings of the bracket and to the metal plate everywhere within the central inner area, leaving the pattern of holes exposed, upon membrane of a membrane-covered roof at a position where an anchor is desired;
(b) folding the transition membrane back to expose the pattern of holes;
(c) fastening the metal plate to the membrane covered roof by fasteners through the holes in the pattern of holes in the metal plate, into decking of the roof beneath the membrane of the membrane-covered roof; and
(d) folding back the transition membrane over the pattern of holes and fasteners, and heat welding the transition membrane to the metal plate over the hole pattern and fasteners, and to the membrane of the membrane-covered roof all around the metal plate.

7. The method of claim 6 further comprising a plurality of brackets arranged in a predetermined pattern and adhered to the central inner area of the metal plate by adhering lower surfaces of wings of the brackets to the upper surface of the metal plate.

8. The method of claim 6 wherein adhesion between the bracket and the metal plate is accomplished by welding, soldering, brazing or by an adhesion glue or cement.

9. The method of claim 6 wherein the metal plate is circular.

10. The method of claim 6 wherein the metal plate is rectangular.

* * * * *